UNITED STATES PATENT OFFICE.

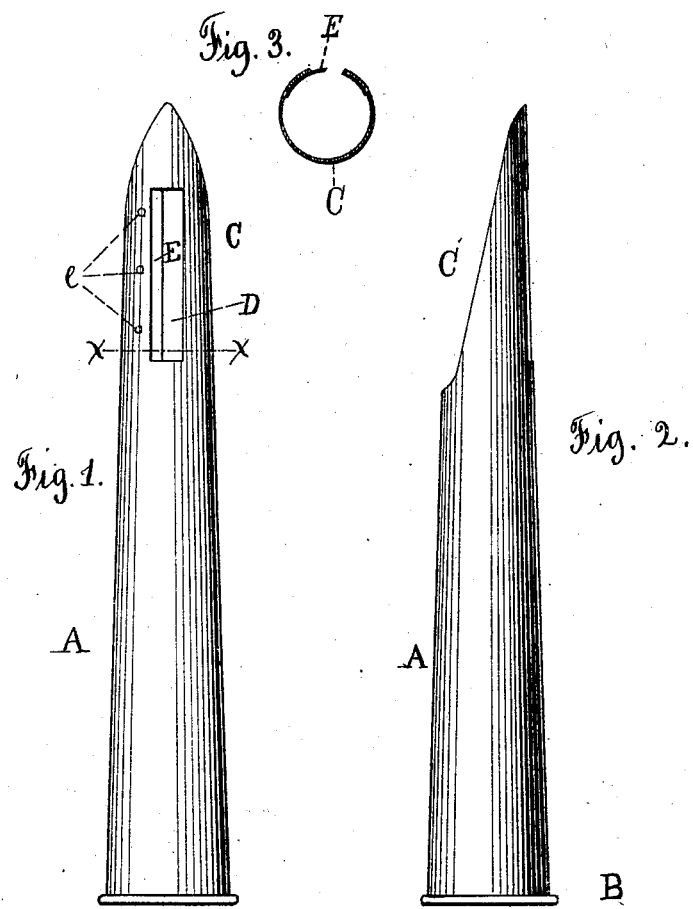

WILLIAM E. BROCK, OF DUNELLEN, NEW JERSEY.

COMBINED PARER AND CORER.

SPECIFICATION forming part of Letters Patent No. 265,748, dated October 10, 1882.

Application filed June 14, 1882. (No model.)

*To all whom it may concern:*

Be it known that I, WILLIAM E. BROCK, a citizen of the United States, residing at Dunellen, in the county of Middlesex and State of New Jersey, have invented a new and useful Implement for Paring and Coring Fruits and Vegetables, as described in this specification and the drawings thereof.

The object of my invention is to produce a parer and corer combined in one and the same implement; and it consists of a sheet-metal tube having one end cut off obliquely to the axis of the tube, so as to form a scoop, and having a longitudinal slot formed in the bottom of said scoop, provided with a separate paring-knife, by securing to one edge of this slot a sharp-edge cutting-blade, or by forming one edge of said slot into a knife or cutting edge.

Figure 1 is a back view of an implement embodying my improvements. Fig. 2 is a side view of the same. Fig. 3 is a transverse section taken through the line $x\ x$.

A is a sheet-metal tube, preferably tapering slightly toward the lower or scoop end. It may be provided at the upper end with a ring or flange, B, to protect the hand and also to strengthen the tube. The lower end of the tube is cut off obliquely to the axis, forming a scoop, C. In the bottom of said scoop is a longitudinal slot, D. To one edge of this slot is attached a sharp-edge cutting-blade, E, which may be secured by rivets $e$ or in any other suitable manner, and arranged so as to brace or strengthen the scoop transversely.

The operation of my invention is as follows: To core a fruit, the lower end of the scoop is pressed into the fruit and turned therein, the cutting-edge of the scoop C separating the fruit from the core, which passes up into the tube A, and is easily extracted from the larger or upper end of the tube. The operation of paring is performed by the blade E, attached to one edge of the slot D, the opposite edge of said slot insuring a uniform thinness of the parings and serving as a guide for the passage of the same through the slot.

The point of the scoop may be used for extracting the eyes from potatoes and for similar purposes.

I am aware that parers have been made with a slotted pointed blade, and that corers have been made with a hollow handle and straight-pointed cutter; but my improvement consists in a device materially different in construction and capable of advantages in use.

The details of construction may be varied within the scope of my improvement.

What I claim as new, and desire to secure by Letters Patent, is—

The combined parer and corer having a tapered hollow handle terminating in an oblique-pointed blade having a slot with a separate cutting-edge, substantially as set forth.

WILLIAM E. BROCK.

Witnesses:
JACOB NEW,
F. I. KENNEDY.